United States Patent

Howard

[15] 3,646,293
[45] Feb. 29, 1972

[54] ELECTRICAL SIGNAL GENERATOR AND LIQUID LEVEL INDICATOR

[72] Inventor: William A. Howard, 6666 Solon Boulevard, Solon, Ohio 44139

[22] Filed: Apr. 6, 1970

[21] Appl. No.: 25,818

[52] U.S. Cl. ..................200/84 C, 335/207, 29/607, 73/313

[51] Int. Cl. ..........................................H01h 35/18

[58] Field of Search ................200/84 C, 81.9 M; 335/207, 335/211, 301; 73/313, 314, 308; 29/607; 315/5.35

[56] References Cited

UNITED STATES PATENTS

| | | | |
|---|---|---|---|
| 2,993,152 | 7/1961 | Pierce et al. | 335/301 |
| 2,425,691 | 8/1947 | Brewer | 73/319 |
| 3,355,622 | 11/1967 | Bradford | 335/211 |
| 3,200,645 | 8/1965 | Levins | 200/84 C |
| 3,412,391 | 11/1968 | Ward | 335/206 |

FOREIGN PATENTS OR APPLICATIONS 1,098,587  8/1955  France..................................73/313

Primary Examiner—David Smith, Jr.
Attorney—Watts, Hoffmann, Fisher and Heinke

[57] ABSTRACT

One or more magnetically operable switches are each actuated a plurality of times by a series of actuating magnets moved past the switch or switches. The switches generate signals indicative of the movement of the magnets. A surface of each magnet that moves past the switch or switches includes a north and south pole portion, and like poles of successive magnets are adjacent each other to open the switches as well as close them under magnetic force. At each end of the series of switch-actuating magnets there is a magnet of lesser strength that constrains the field of each end magnet to a zone substantially equal to that of the intermediate magnets and prevents premature actuation of a switch as the magnets approach. A preferred circuit produces a separate electrical pulse each time a switch is opened and each time it is closed. In a particular application of the mechanism, the magnets are carried by a float in a liquid-containing vessel past stationary switches as the liquid level changes. Pulses produced by the switches indicate the position of the float.

17 Claims, 7 Drawing Figures

Patented Feb. 29, 1972
3,646,293
2 Sheets-Sheet 1
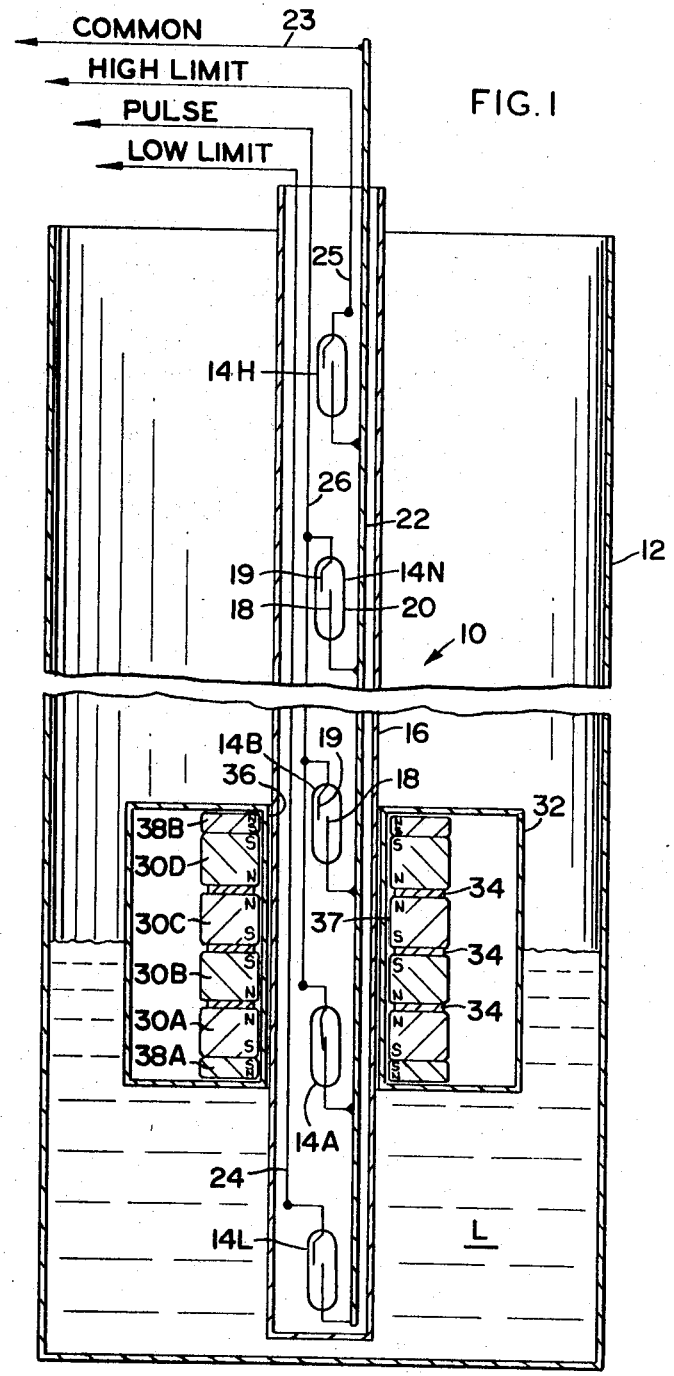
FIG. 1
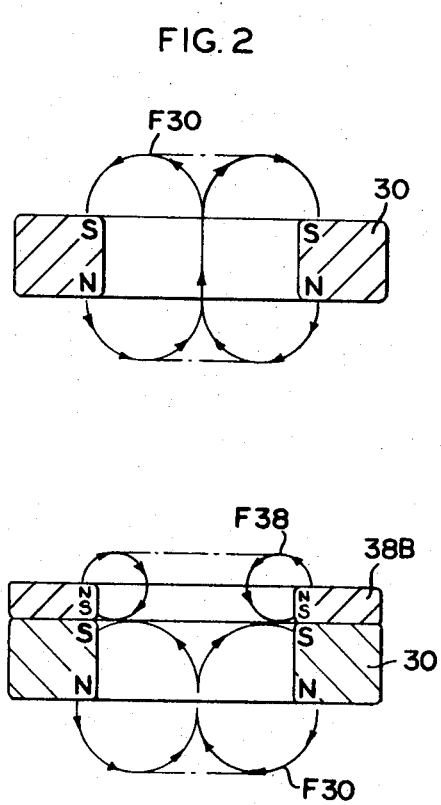
FIG. 2
FIG. 3
INVENTOR.
WILLIAM A. HOWARD
BY
Watts, Hoffmann, Fisher & Heinke
ATTORNEYS.

Patented Feb. 29, 1972
3,646,293
2 Sheets-Sheet 2
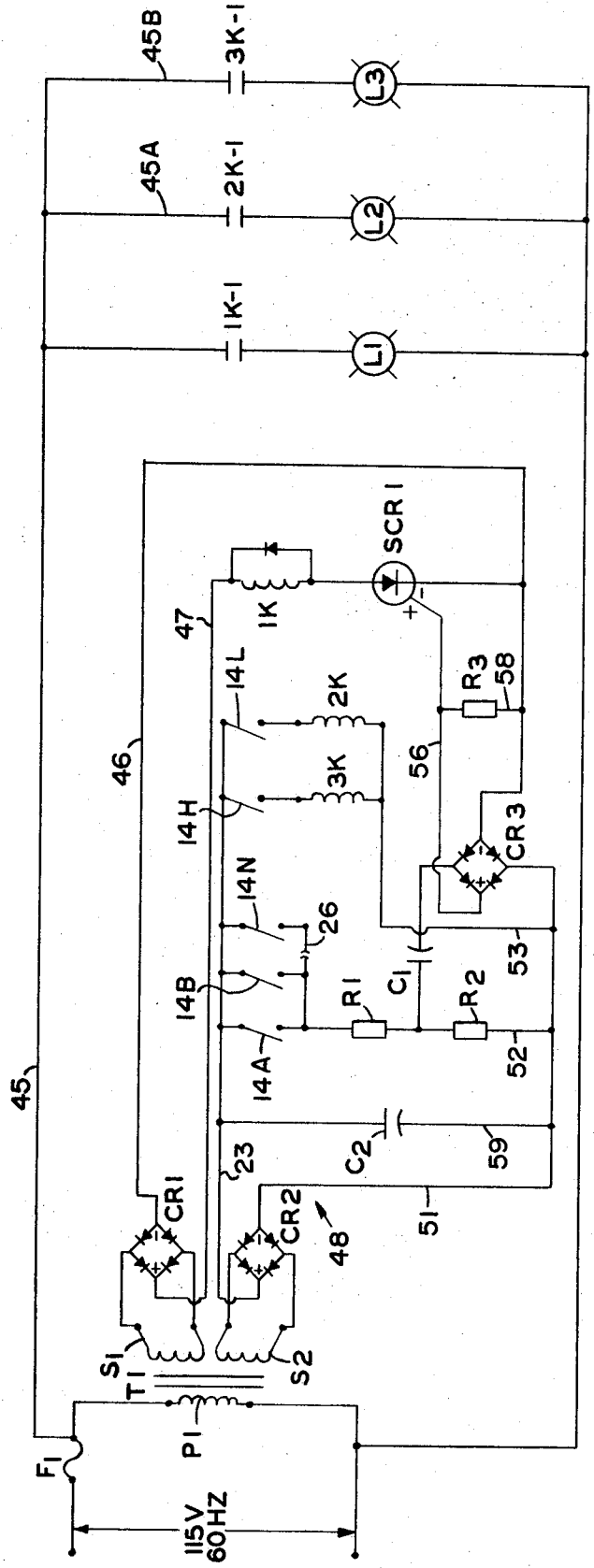
INVENTOR.
WILLIAM A. HOWARD
BY
Watts, Hoffmann, Fisher & Heinke
ATTORNEYS.

ELECTRICAL SIGNAL GENERATOR AND LIQUID LEVEL INDICATOR

FIELD OF THE INVENTION

This invention relates to electrical signal generators of the magnetic switch type and to a liquid level indicator that generates pulses indicative of a change in liquid level.

BACKGROUND OF THE INVENTION

Magnetic switches, i.e., switches that are actuated by the effects of a magnetic field, find use in circuits of various types and have the advantages of extremely long life, high reliability, the ability to be enclosed in a sealed capsule or the like, and to be actuated by a magnetic field that can be applied externally. In many applications, a magnetic switch is actuated by a relatively movable magnet. Two examples of the use of such switches in one field to which the present invention finds particular application are U.S. Pat. Nos. 3,200,645 and 3,437,771.

SUMMARY OF THE INVENTION

The present invention provides methods and apparatus for producing a plurality of pulses from each of one or more sequentially arranged magnetic switches, using a series of closing adjacent switch-actuating magnets that are movable past the one or more switches. With this invention, each switch is successively actuated by each magnet so that a relatively large number of electrical signals or pulses can be produced from a relatively few number of switches. This permits a high digital signal output to be produced in response to a small degree of relative movement, notwithstanding the space requirements of presently known magnetic switches, which inherently limit the number of switches that can be provided along a given path and hence the number of sequential pulses that can be obtained in response to movement of an actuating magnet past the switches, where each switch produces only a single pulse.

An accurate correlation of the position of the actuating magnets relative to an actuated switch is assured in accordance with the present invention by constraining the magnetic field at the leading end of the series of actuating magnets to a zone substantially equal to each of the magnetic zones of the following intermediate magnets, which are restricted in their longitudinal extents by the magnets on each side.

With the ability to produce a large number of pulses in response to a relatively small degree of movement and to produce successive pulses, each accurately responding to a given increment of movement of the actuating magnets, the progressive change in position of the magnets and a movable member carrying the magnets is known with substantial precision. Also, because the signal output is digital rather than analogue, it is convenient to feed the output to a counter or to record the output on a tape, for example, for inventory control. The digital output also facilitates summing the output signals from several indicators, as in the instance where each of a plurality of liquid storage tanks has a liquid lever indicator and knowledge of the total quantity of stored liquid is desired. The digital output of each indicator can either be recorded or can be supplied directly to a digital computer.

A further feature of this invention is a novel circuit that produces a pulse from both the closing and the opening of each magnetic switch. Thus, an increment of movement of the actuating magnet is sensed as the switch opens, i.e., when the magnets have advanced half the distance required to create the next successive closing pulse. This doubles the digital output and sensitivity obtained from a given number of switches and magnetic actuators that produce signals only in response to being closed.

The present invention is advantageously embodied in a liquid level indicator but can, of course, be embodied in other linear transducers, as well. A plurality of magnetic switches are spaced along a predetermined path and a plurality of magnets, arranged in a series, is movable along the path in response to a change in liquid level in a vessel. In the preferred embodiment, a plurality of switch-actuating magnets are carried by a float and guided past the magnetic switches. Conveniently, the switches are located in a sealed tube oriented vertically within the liquid-containing vessel. The tube serves as a guide for the float, which carries the actuating magnets. Switch-actuating magnets all have aligned surfaces with north and south pole portions and are arranged sequentially, with like poles of successive magnets adjacent. The switches are of the normally open reed type and the reeds of each switch extend in the direction of magnet movement along the predetermined path, partially overlapping each other longitudinally. As the magnets move, the reeds of one switch are successively closed and opened when subjected to the changing magnetic fields produced by the series of magnets. The magnets pass each successive switch only after leaving the preceding switch. Because the successive magnets have like poles adjacent, the switch influenced by the magnetic fields will be positively opened when the trailing portion of the preceding magnet and the leading portion of the subsequent magnet are both adjacent the switch, polarizing both reeds of the switch alike, causing them to separate. As soon as the preceding magnet moves beyond the switch, the reed adjacent the succeeding magnet becomes substantially more polarized than the other reed and acts as a magnet to attract the relatively nonpolarized reed. This attraction is immediately reinforced upon further movement of the series of actuating magnets, which brings the succeeding magnet directly opposite the two reeds of the switch so that each opposite pole of the magnet primarily affects a different one of the two reeds to assure a positive closing action of the switch.

A particularly important feature of this invention is the provision of what will be termed a "biasing" magnetic field produced by a "biasing" magnet at each end of the series of switch-actuating magnets. The biasing magnets are of lesser magnetic strength than the switch-actuating magnets and serve to constrain or bias inward the magnetic field of the endmost switch-actuating magnet. This prevents the leading switch-actuating magnet from prematurely actuating a magnetic switch as the series of magnets approaches the switch. This, in turn, assures that the first pulse from a succeeding magnetic switch is produced in response to the same degree of movement of the actuating magnets as is each pulse produced by the intermediate magnets.

The above and other features and advantages of this invention will become more apparent and the invention will become better understood from the detailed description of the invention which follows, when considered in connection with the accompanying drawings.

BRIEF DESCRIPTION OF THE DRAWINGS

FIG. 1 is a schematic sectional view of a vessel and liquid level indicator in the form of a linear transducer embodying the present invention;

FIG. 2 is a diagrammatic showing of a magnetic field produced by a single magnet of the type shown in FIG. 1;

FIG. 3 is a schematic diagram of a magnet similar to that shown in FIG. 2, shown in association with an adjacent magnet of smaller strength, illustrating the manner in which the adjacent magnet effects the magnetic field;

FIG. 4 is a schematic diagram illustrating the magnetic fields of a plurality of magnets of the type shown in FIG. 1 and illustrating the manner in which the magnetic fields act upon magnetic switches;

FIG. 5 is a schematic diagram similar to FIG. 4, showing the magnets advanced, relative to the switches, somewhat farther along the path of relative movement than in FIG. 4;

FIG. 6 is a schematic diagram similar to FIGS. 4 and 5, showing the magnets further advanced along the path of travel relative to the fixed magnetic switches; and FIG. 7 is a schematic wiring diagram of an electrical circuit for producing an electrical pulse each time a magnetic switch is closed or opened.

DESCRIPTION OF PREFERRED EMBODIMENT

A liquid level indicating system embodying the present invention is indicated generally by reference numeral 10 in FIG. 1. The system functions as a linear transducer and produces electrical output pulses in response to changes in level of a liquid L within a liquid-containing vessel 12.

The liquid level indicating system 10 includes a plurality of vertically aligned magnetic reed switches 14 of known construction, aligned in a vertical, closed bottom, magnetically permeable tube 16, preferably made of plastic, positioned within the vessel 12 and extending substantially the entire height thereof. In the arrangement of switches shown, there is a low limit switch 14L adjacent the bottom of the tube 16 and near the bottom of the vessel 12, a high limit switch 14H adjacent the upper part of the tube 16 and near the top of the vessel 12, and a plurality of pulsing switches or counter switches 14A, 14B ... 14N. All of the switches 14 are spaced an equal distance, one from the next. Each includes two ferromagnetic reeds 18, 19 within a sealed glass capsule 20. The reeds, as shown in the preferred embodiment, are normally open and are sufficiently flexible to deflect into mutual contact under the influence of an appropriate magnetic field. One reed of each switch, reed 18 in the embodiment shown, is connected to a common electrical conductor 22 of sufficient strength and rigidity to support the switches 14 in proper spaced alignment within the tube 16. The electrical conductor 22 is connected b a lead 23 to an electrical circuit, to be described in detail in connection with FIG. 7. The reed 19 of the lower limit switch 14L is connected to a lead 24, the reed 19 of the high limit switch 14H is connected to a lead 25 and the reeds 19 of the pulse switches 14A, 14B ... 14N are connected to a common lead 26. Each of these leads is connected in an electrical circuit as shown in FIG. 7, to be described subsequently.

A plurality of vertically stacked, switch-actuating, permanent magnets 30, annular in shape, surround the tube 16. The magnets are supported for vertical movement relative to the tube 16 and switches 14 by a magnetically permeable float 32 that is annular in shape, preferably made of plastic, sealed to form an airtight vessel, and of sufficient displacement to support the weight of the magnets 30 in floating relationship to the liquid L within the vessel 12. The float closely surrounds the tube 16, and is movable along the length of the tube 16 within the vessel 12 as the liquid level changes. Four switch actuating magnets, 30A, 30B, 30C, 30D of equal size and magnetic strength are provided in the embodiment shown, each spaced vertically from the next by a nonmetallic spacer ring 34. An inner wall 36 of the float maintains the magnets aligned vertically and serves to locate the float about the tube 16. The number of magnets provided can be varied, depending upon the thickness of the individual magnets, the height to which the magnets can be stacked without unduly limiting the effectiveness of the float, the number of switches 14 that are provided, and the number of signals that are desired for a given linear movement of the float. For example, as the number of magnets and the height of the float becomes large with respect to the height of the tank or vessel 12, the distance that the float can actually move without extending above the vessel top is substantially less than the distance a float of lesser height could move. Thus, in a closed top vessel, float height must be kept small relative to the vessel height so that the float does not reach its upper and lower limits of travel before the vessel is substantially full or empty. Conversely, if very few or a single magnet is used, a relatively large number of switches are required to produce a large number of pulses and substantial difficulties are encountered in providing a large number of closely spaced switches and in assuring individual sequential actuation of the switches. In accordance with this invention, an optimum or near optimum arrangement can be attained by utilizing a plurality of magnets to actuate each of a plurality of switches a number of times and thereby provide a reasonable and acceptable spacing between successive switches while yet utilizing a float of relatively small height with respect to the overall height of the liquid containing vessel.

Each magnet 30 has an inner annular face 37. All of the faces 37 are aligned vertically, i.e., in the direction of the movement of the magnets past the switches 14. Opposite axial ends of each annular magnet 30 are of opposite polarity, as indicated by the letters "N" and "S" designating, respectively, the north and south magnetic poles of each magnet. The switch-actuating magnets 30 are arranged so that the adjacent poles of each successive magnet are of like polarity. That is, the north pole of the magnet 30A is adjacent the north pole of the adjacent magnet 30B. The south pole of the magnet 30B is adjacent the south pole of the next magnet 30C, and so on. This permits the actuating magnets to be closely adjacent each other yet alternately close and open the switches 14 as the directly successive magnets move past, as will be explained in more detail subsequently. The spacers 34 between adjacent switch-actuating magnets 30 provide a desired axial distance and desired overall axial height of the stack of magnets, relative to the positions of the switches 14, so that the magnets properly correlate with the switch spacing to assure not only the desired sequential operation of each individual switch in response to movement of the float of a predetermined magnitude, but also the actuation of the subsequent switch in response to further float movement of the same magnitude after the last actuation of the preceding switch. For this purpose, the overall height of the switch-actuating magnets 30A-D from the top surface of the top magnet 30D to the bottom surface of the bottom magnet 30A is substantially equal to the distance between corresponding parts of successive switches 14. This assures transition of signal generation from one switch 14 to the next, for an increment of float movement equal to that which produced successive actuations of the preceding switch. In the event the magnets alone correlate with the switch spacing, the spacers can be omitted. From the standpoint of a practical construction, they are desirable.

At each opposite end of the stack of switch-actuating magnets 30, a relatively thinner and weaker magnet 38 is provided. Thus, a smaller magnet 38A is directly adjacent the switch-actuating magnet 30A and a weaker magnet 38B is directly adjacent the switch-actuating magnet 30D, each at the outer end of the stack. These magnets 38 each have an inner annular surface 39 aligned with the inner annular surfaces 37 of the switch-actuating magnets 30 and the opposite poles of these magnets are at opposite axial ends. These magnets, too, are arranged so that the pole that is adjacent to the end switch-actuating magnet is of like polarity to the end pole. That is, the end of the magnet 38A of south polarity is adjacent the south polar end of the magnet 30A and the same is true of the magnet 38B with respect to the switch-actuating magnet 30D, as shown in FIG. 1.

The magnets 38 are of insufficient magnetic strength to actuate the switches 14. This is indicated in the drawings by the diagrammatic flux lines F38 that are shown of smaller size than the flux lines F30 of the switch-actuating magnets. The purpose of the end magnets 38 is to constrain the path of magnetic flux of the end magnets 30A and 30D to a zone substantially equivalent to the zone of magnetic flux of the interior switch-actuating magnets 30B and 30C of the stack of magnets, so that the leading end magnet 30A or 30D (depending upon the direction of movement) affects the switches 14 only when it is in the same relative position with respect to a switch 14 as any following magnet is at the time it actuates the same switch during movement of the float. The effect of the end magnets 38 will be best understood from a comparison of FIGS. 2, 3 and 4. As shown diagrammatically in FIG. 2, the typical flux of an individual magnet 30 would extend axially beyond the physical limits of the magnet. When the magnet is bounded on opposite sides by additional magnets, as the magnet 30B or 30C is bounded, the magnetic fields of the adjacent magnets confine the magnetic flux of the bounded magnet substantially to an area directly opposite the inner annular wall. On the other hand, the field of the end magnet of a stack would extend its normal distance beyond the end of the stack, that is, the distance indicated at either axial end in FIG. 2. This is prevented in the present arrangement by the smaller magnets 38, which are of sufficient strength to substantially constrain the magnetic flux of the adjacent end magnet to a zone that does not extend axially beyond the outer end face of the magnet, as illustrated diagrammatically in FIG. 3. At the same time, the extension of the magnetic flux F38 of the smaller magnet beyond the end of the stack of magnets has no effect upon the switches 14, because the flux is too weak to actuate the switches. The approximate effective zones of magnetic fluxes of the complete stack of magnets is diagrammatically shown in FIGS. 4 to 6.

The manner in which the successive switches 14A, B . . . 14N are successively actuated, each a plurality of times, is depicted in FIGS. 4 to 6. The magnets 30 and 38 are moved upward by the float 32 as liquid is introduced to the vessel 12 and downward as liquid is removed from the vessel 12. The actuation of the switches is similar regardless of which direction the float is moved, and for purposes of discussion, the float will be considered as moving upward while the vessel is being filled. As the float moves upward, the magnets are moved along a predetermined vertical path defined by the tube 16 and thus each switch-actuating magnet 30 moves, one after the other, past each switch 14A, 14B . . . 14N. As previously mentioned, the successive switches 14A, 14B, for example, are spaced along the length of the path of movement of the magnets a distance such that the successive higher switch 14B is not closed by the approaching top magnet 30D until after the preceding switch 14A has opened after the trailing magnet 30A moves upward, beyond the switch. In addition, the switch and magnet locations and spacings are such that the switch 14B is first closed by the magnet 30D in response to an increment of movement of the magnets along the path from that position at which the switch 14A last opened, that is equal to the increment of movement that causes any of the switches 14A, 14B . . . 14N to be switched from an open to a closed position by each successive magnet 30A-D of the series.

With more specific reference now to FIG. 4, the float is illustrated in approximately the same position as shown in FIG. 1 of the drawings. The trailing switch-actuating magnet 30A is directly opposite the switch 14A, while the leading switch-actuating magnet 30D is not yet positioned to close the switch 14B. The reeds 18 and 19 of the switch 14A are in contact with each other, because the reed 18 is predominantly polarized by the south pole of the magnet 30A while the reed 19 is predominantly polarized by the north pole of the magnet 30A. Thus, the two reeds have attracted each other and are in contact, closing the switch 14A to produce a pulse signal through the lead 26. As illustrated in FIG. 4, the magnet 38B, while directly opposite the switch 14B, has not caused the switch to close. At the same time, it has constrained the field of the switch-actuating magnet 30D so that the south pole of the magnet 30D has not sufficiently magnetized the reed 18 of the switch 14B to cause it to attract the reed 19. The magnet 38B, then, has prevented the switch-actuating magnet 30D from prematurely closing the switch 14B. It will be appreciated that the magnet 30D must be in the position shown in FIG. 4 in order to close the switch 14B in response to an incremental movement of the stack of magnets equal to the same increment used to close the switch 14A from an open position as the magnets precede therepast. That is, the switch 14B could not merely be spaced farther away from the switch 14A to avoid the premature operation by the normally extending flux path F30 of the end most magnet 30D, because then a substantially greater increment of float movement would be required before the magnet 30C could influence the switch 14B to open the switch and the pulses would not all be produced in response to equal increments of float movement.

As shown in FIG. 5, the position of the stack of magnets 30, as carried by the float 32, has advanced upward relative to the switches 14A and 14B. The switch 14A is now out of the influence of the magnetic field of the magnet 30A and therefore opens, being a normally opened switch. The switch spacing is such that the switch 14A opens in response to less upward movement of the magnets from the position of FIG. 4 than is required to close the switch 14B. Accordingly, the switch 14A is opened prior to the closing of the switch 14B. In the position of the magnets shown in FIG. 5, the switch 14B has been closed, the closing having occurred as soon as the magnetic field of the magnet 30D sufficiently polarized the reed 18 causing it to attract the reed 19. The magnetic field from the small end magnet 38A is insufficient to cause the lower switch 14A to close, notwithstanding the proximity of the magnetic field. At the same time, the magnetic field of the magnet 38A has constrained the magnetic field of the magnet 30A so that the switch 14A can open in response to an increment of movement of the magnets comparable to that which previously caused it to open as the preceding magnets moved past. Without the magnetic field of the magnet 38A, the field of magnet 30A would extend axially beyond the physical limits of the magnet 30A and would have maintained the switch 14A closed by virtue of polarizing the reed 19 even with the magnet 30A in the position shown in FIG. 5. It will be appreciated that the increment of movement causing the final opening of any switch 14 will be brought into substantial equality with that causing the preceding openings of the switch by virtue of the magnet 38A, but not into exact equality because the reed 18 is not oppositely polarized from the reed 19 when the magnet 30A moves to a position where it influences only the reed 19. In contrast, the reed 18 is oppositely polarized when any of the preceding magnets of the series is at a corresponding position. Accordingly, the final opening of the switch is not quite so prompt as the preceding openings, but the difference is not of practical significance in contemplated applications.

In FIG. 6, the stack of magnets is shown in a position slightly advanced from that shown in FIG. 5, illustrating its position just after the switch 14B has opened, subsequent to its first closing. As the magnets advanced upward to the position shown, the trailing north pole of the magnet 30D predominantly polarized the reed 19 of the switch 14B and the adjacent north pole of the successive magnet 30C polarized the reed 18 of the switch 14B. The two reeds, being similarly polarized, magnetically repelled each other to positively open the switch 14B. It will be apparent that further upward movement of the stack of magnets will result in the polarizing of the reeds 18 and 19 of the switch 14B by the magnet 30C in the identical manner illustrated in FIG. 5 in connection with the preceding magnet 30D. This continues throughout the stack of magnets until the next switch is approached and the cycle, as initially described in connection with FIG. 4, is repeated with the next successive switch 14.

Actuation of the switches 14A, 14B . . . 14N as well as switches 14L and 14H produce pulses through an electrical circuit shown in FIG. 7. A pulse produced from the switch 14L OR 14H indicates that the float 32 is at its lower or upper position. Pulses produced from the switches 14A, 14B . . . 14N can be counted to indicate the position of the float between the upper and lower limits of its travel and thereby indicate the level of the liquid within the vessel and hence the volume of liquid within the vessel. The rate at which the pulses are produced will also indicate the rate at which the liquid is rising or falling. It will be appreciated that the greater the number of pulses for an incremental distance of float movement, the more sensitive will be the measurement of liquid level; i.e., smaller variations in liquid level will be indicated. With the circuit shown in FIG. 7, a pulse is produced not only each time a switch 14A, 14B . . . 14N is closed, but also each time the switch is opened. Thus, each switch 14A, 14B . . . 14N provides a number of pulses equal to twice the number of switch-actuating magnets carried by the float 32. Accordingly, by utilizing a relatively large number of magnets, such as from four to ten, anywhere from eight to twenty signals can be produced from each switch.

In the circuit of FIG. 7, a pulse indicator L1 is shown in an electrical line 45, along with contacts 1K-1 of a relay coil 1K. The line 45 is connected to a source of 115 vold 60 cycle alternating current. The circuit includes a fuse F1. Parallel circuit lines 45A and 45B contain, respectively, pulse indicators L2 and L3 and contacts 2K-1 and 3K-1 of coil relays 2K and 3K. The pulse indicator L1 is operated each time the switches 14A, 14B . . . 14N open or close, the pulse indicator L2 is operated when the low level switch 14L is closed and the pulse indicator L3 is operated when the high level switch 14H is closed.

The transformer T1 has a primary winding P1 connected to the 115 volt, 60 cycle current input and has two secondary windings S1 and S2. The winding S1 is connected to the coil relay 1K through a rectifying bridge circuit CR1 and output lines 46 and 47 from the rectifier circuit. Line 47 includes in series with the coil relay 1K a silicon controlled rectifier SCR1 that must be triggered to permit energization of the coil relay. The silicon controlled rectifier is triggered by a circuit indicated generally by reference 48 connected to the secondary winding S2 of the transformer T1. The output of the winding S2 is rectified by a rectifying bridge circuit CR2 that has two output lines, one being the common line 23 and the other being a line 51. The switches 14A, 14B . . . 14N are connected in parallel across the common line 23 and the pulse line 26. The line 26 is connected by a line 52 to the line 51 from the rectifier circuit CR2. Two series resistances R1 and R2 are provided in the line 52. The switches 14L and 14H are in parallel circuits through the coil relays 2K and 3K, from the rectifier circuit CR2, and complete circuits through the relay coils via the lines 23, 53 and 51.

The triggering circuit 48 provided for the silicon controlled rectifier SCR1 including a rectifying bridge circuit CR3 and a capacitor C1 in line 54. The capacitor and rectifier circuit CR3 are in parallel with the resistance R2 of the line 52 and the output from the rectifier circuit CR3 is connected to the line 46 and to a line 56. The line 46 is connected to the line 47 and thus to the cathode of the silicon controlled rectifier SCR1 and the line 56 is connected to the control electrode of the silicon controlled rectifier. A resistance R3 in a line 58 across the lines 46 and 56 applies a potential to the control electrode in response to a flow of current through the rectifier CR3 and the circuit lines 46, 56. A capacitor C2 is provided in a line 59 across the output lines 23 and 51 of the rectifier circuit CR2 to provide a uniform electrical output therefrom.

It will be apparent from the above circuit that whenever the low level switch 14L or high level switch 14H is closed, a circuit will be completed from the secondary winding of the transformer T1 through either the relay coil 2K or 3K, to close the associated switch 2K-1 or 3K-1 and the indicator L2 or L3 will be energized to indicate that the float 32 is either at the low level or high level position.

As the float moves past any of the switches 14A, 14B . . . 14N, the associated switch is opened and closed a plurality of times and thereafter the next successive switch is opened and closed a plurality of times. Each time a switch 14A, 14B . . . 14N is opened or closed, it completes a circuit across the rectified output from the secondary winding S2, through the lines 23, 26, 52 and 51, and a pulse is produced as follows: The flow of current through the resistor R2 in the line 52 in response to the closing of the switch creates a potential difference across the resistor R2 and charges the capacitor C1. The potential difference across the resistor R2 drives the control electrode of SCR1 positive through the rectifier circuit CR3, triggering the silicon controlled rectifier and permitting current to flow through the coil relay 1K. This closes the switch 1K-1 in line 45 and activates the pulse indicator L1 momentarily, the time duration being controlled by the R-C circuit parameters. When the actuated switch 14 opens, the capacitor C1 discharges, creating a potential across the resistor R2 and a current flow through the rectifier circuit CR3 to again trigger the control electrode of SCR1 and permit current to flow through the coil relay 1K to again close the contacts 1K-1 and again energize the pulse indicator L1 momentarily. This sequence is repeated each time a switch 14 is closed and opened, thereby producing two signals each time a magnet 30 moves past a switch 14.

While a preferred embodiment of this invention has been disclosed in detail, it will be apparent that various modifications and alterations may be made therein without departing from the spirit and scope of the invention as set forth in the appended claims. For example, it will be readily apparent that the arrangement of switches and a series of magnets as specifically described functions as an effective and accurate linear transducer and while it has particular and advantageous applicability to a liquid level indicator it can be used in other environments. Moreover, it will be appreciated that in a liquid level indicator, various arrangements may be provided to move a series of magnets past a series of spaced switches in response to movement of a float by changes of a liquid level. For example, the configuration of the magnets and the manner in which they are guided past the series of switches can be accomplished with a variety of structures, the structure disclosed being a preferred embodiment.

As disclosed in the foregoing description, a pulse generator in the form of a linear transducer particularly useful as a liquid level indicator and which utilizes magnetically actuated switches and a plurality of permanent magnets movable past the switches, has been provided which produces a large number of output signals from a substantially few number of switches. As a result, high sensitivity and reliable actuation of switches in a predetermined sequence is obtained even though the switch size and/or limited space prevent the use of a large number of switches.

What is claimed is:

1. A method o producing a plurality of electrical pulses from a magnetic switch including the steps of providing an aligned finite series of adjacent magnetic fields, each of a substantially equal first magnitude, with similar poles of the adjacent fields adjacent to each other, providing a magnetic field of smaller magnitude at each opposite end of the series with the polarity of each smaller magnitude field that is adjacent an end field of the series being the same as that at the adjacent end of the series, providing a magnetically operable switch having contact elements that can be magnetically moved together and apart by a magnetic field or fields, moving the series past the switch at a distance close enough that said series of magnetic fields of a first magnitude successively causes the switch to close and open and far enough away that the magnetic fields of smaller magnitude will not actuate the switches.

2. The method as set forth in claim 1 wherein a second magnetically operable switch is spaced from the first-mentioned magnetic switch along the path of movement of the series of magnetic fields, and including the step of closing said first-mentioned magnetically operable switch a number of times equal to the number of magnetic fields of said first magnitude in said series in response to movement of the series past said first-mentioned magnetic switch, each closing being in response to a finite distance of travel of the series, equal for each field, and therefore moving the series past said second magnetically operable switch and closing said second switch a number of times, the first closing thereof being in response to a distance of travel of the series after the last closing of said first-mentioned magnetically operable switch equal to said finite distance of travel.

3. A method of controlling magnetic fields of a series of magnetic fields of sufficient strength to actuate a reed switch when moved therepast along a predetermined path, including the steps of limiting the extent of the magnetic field at each end of the series in a direction along said predetermined path by applying a biasing magnetic field at each end of the series, with a like polarity opposing the the end polarity of the series and of insufficient strength to actuate the reed switch when moved therepast with said series but of sufficient strength to confine the effective extent of each field at the end of said series, in a direction along said path away from said series, to the distance the field extends along said path inwardly of the end of said series.

4. A method of producing digital output signals indicative of a change in liquid level in a vessel in response to movement of a float supported by liquid in the vessel, including the steps of providing a magnetically operable switch at a predetermined position, carrying a series of magnets for movement by said float past said switch and aligned in series in the direction of movement of the magnets, changing the level of liquid in the vessel, thereby moving the float relative to the vessel and the series of magnets past said switch, and producing an electrical signal each time one of said series of magnets moves past the switch, whereby a single switch indicates a plurality of incremental changes in the level in the vessel.

5. The method as set forth in claim 4 wherein a second magnetically operable switch is spaced from the said first-mentioned magnetic switch along the path of movement of the series of magnets, and including the step of first opening and closing the said first-mentioned magnetically operable switch a number of times equal to the number of magnets in said series in response to movement of the series past said first-mentioned magnetic switch, each actuation being in response to a finite distance of travel of the series, equal for each magnet, and thereafter moving the series past said second magnetically operable switch and opening and closing said second switch, the first actuation thereof being in response to a distance of travel of the series after the last actuation of said first-mentioned magnetically operable switch equal to said finite distance of travel.

6. A method of producing digital output signals indicative of a change in liquid level in a vessel in response to movement of a float supported by liquid in the vessel, including the steps of providing a plurality of magnetically actuatable switches at predetermined spaced positions, carrying a series of magnets for movement by said float past said switch and aligned in series in the direction of movement of the magnets, limiting the extent of the field of the magnet at each end of the series in a direction along the direction of movement of the magnets by applying a magnet field at each end of the series with a like polarity opposing the end polarity of the series and of insufficient strength to actuate said switches but of sufficient strength to limit the effective extent of the field of the adjacent end magnet of the series in a direction along the path of movement away from said series of magnets to the distance the field extends along the path of movement inwardly of the series, changing the level of liquid in the vessel, thereby moving the float and the series of magnets relative to the vessel and past said switches, producing at least one electrical signal each time one of said series of magnets moves past a switch, said switches being spaced relative to the dimension of the series of magnets considered in the direction of movement such that the first signal produced by a successive switch follows the last signal produced by the preceding switch in response to an increment of float movement equal to the increments that create successive signals from an individual switch.

7. The method as set forth in claim 6 including the steps of providing an electrical signal each time the float approaches an upper and lower limit of travel.

8. The method as set forth in claim 6 including the step of producing two electrical signals each time one of said series of magnets moves past a switch, one when the switch closes and one when it opens.

9. A liquid level indicator for use with a liquid-containing vessel, comprising a magnetically operable switch adapted to be fixed at a predetermined location with respect to a vessel for containing liquid and adapted to form a part of an electric circuit whereby actuation of the switch will produce an electrical signal, a float adapted to be located within a liquid-containing vessel, movable with a change of liquid level past said switch, means to guide said float along a vertical path closely adjacent to said switch, and a plurality of similar switch-actuating magnets secured to and carried by the float for movement relative to said switch, said magnets being arranged one above another with surfaces that form magnetic pole portions aligned vertically and with like poles of each successive magnet adjacent, and of sufficient magnetic strength to actuate said switch when moved therepast.

10. A liquid level indicator as set forth in claim 9 including a second magnetically operable switch spaced a predetermined vertical distance from said first-mentioned magnetically operable switch along the path of said float provided by said guide means, said second switch being of identical construction to the first-mentioned switch and spaced therefrom such that the distance between corresponding parts of the successive switches along said path is equal to the height of the arrangement of said magnets.

11. A liquid level indicator as set forth in claim 10 including circuit means connected to said switch to produce a signal in response to a closing of the switch and a signal in response to the opening of the switch.

12. A liquid level indicator as set forth in claim 10 including an additional magnet above and below said plurality of switch-actuating magnets with surfaces that include magnetic pole portions aligned vertically with the similar surfaces of said switch-actuating magnets and with a like pole opposing the adjacent end pole of said plurality of switch-actuating magnets, said additional magnets having insufficient magnetic strength to actuate said switches but sufficient magnetic strength to limit the effective extent of the field of the adjacent end magnet of said plurality of switch-actuating magnets in a direction vertically inwardly of the arrangement thereof so that the field extends outward from each end of the arrangement substantially no further than it extends inward.

13. A liquid level indicator as set forth in claim 12 including a nonmagnetic spacer, thin with respect to the switch-actuating magnets, between each switch-actuating magnet and the next.

14. A liquid level indicator as set forth in claim 13 wherein all of the said magnets are annular and encircle said switches as they are moved adjacent said switches along said vertical path.

15. Apparatus for producing electrical signals in response to the movement of a member past a plurality of switches, comprising: a plurality of magnetically operable switches spaced along a path of movement of a member, said switches being similar in construction each to the others, each having two contact elements extending in opposite directions from an area of mutual overlap, which elements can be magnetically moved together and apart as each becomes oppositely or similarly polarized relative to the other by a magnetic field or fields; a plurality of switch-actuating magnets carried by said member, arranged in a series with surface portions of each magnet aligned with surface portions of the others in a direction along said path of movement of said member, which surface portions of each magnet include north and south polarities, the like polarities of adjacent magnets being adjacent each other and the switch-actuating magnets being of sufficient magnetic strength to actuate said switches when said member is moved along said path; and an additional magnet above and below said switch-actuating magnets with surface portions that include north and south magnetic pole portions aligned with said surface portions of the switch-actuating magnets and with a like pole opposing the adjacent end pole of said plurality of switch-actuating magnets, said additional magnets having insufficient magnetic strength to actuate said switches when said member moves along its path, but sufficient magnetic strength to limit the effective extent of the field of the adjacent end magnet of said plurality of switch-actuating magnets outwardly from the end so that the field extends beyond the end of the aligned switch-actuating magnets substantially no further than it extends inward; said magnetically operable switches being spaced each from the next a distance between corresponding parts thereof substantially equal to the distance that the switch-actuating magnets extend along said path.

16. Apparatus for indicating relative movement between magnets and switches, comprising: a plurality of similar magnets each constructed with a north and south pole located in or along a common real or imaginary surface, said surfaces of all said magnets being arranged in a succession, at least one of the poles of each magnet being adjacent a like pole of a successive magnet, a plurality of magnetically operable switches arranged in a succession capable of being successively traversed by or of successively traversing said magnets, means for connecting said switches to an electrical circuit that is responsive to operation of said switches, and means to effect relative movement between said magnets as a group and said switches as a group.

17. Apparatus as set forth in claim 16 wherein said switches are spaced apart successively a distance such that only one switch is operated at a time by said magnets.

* * * * *